US012387262B1

(12) United States Patent
Eutsler et al.

(10) Patent No.: US 12,387,262 B1
(45) Date of Patent: Aug. 12, 2025

(54) LOCALIZATION CONTROL FOR NON-FUNGIBLE TOKENS (NFTS) VIA TRANSFER BY CONTAINERIZED DATA STRUCTURES

(71) Applicant: Wells Fargo Bank, N.A., San Francisco, CA (US)

(72) Inventors: Nathaniel C. Eutsler, San Francisco, CA (US); Matthew Mullin Shepherd, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 257 days.

(21) Appl. No.: 18/100,811

(22) Filed: Jan. 24, 2023

(51) Int. Cl.
*G06Q 40/04* (2012.01)
*G06Q 20/36* (2012.01)
*H04L 9/30* (2006.01)
*H04L 9/32* (2006.01)

(52) U.S. Cl.
CPC .......... *G06Q 40/04* (2013.01); *G06Q 20/367* (2013.01); *H04L 9/30* (2013.01); *H04L 9/3213* (2013.01); *H04L 2209/60* (2013.01)

(58) Field of Classification Search
CPC ........ G06Q 40/04; G06Q 20/367; H04L 9/30; H04L 9/3213; H04L 2209/60
See application file for complete search history.

(56) References Cited

U.S. PATENT DOCUMENTS

| | | | |
|---|---|---|---|
| 2019/0244207 A1* | 8/2019 | Samuel | G06Q 20/405 |
| 2020/0242105 A1 | 7/2020 | Rich et al. | |
| 2020/0342539 A1 | 10/2020 | Doney | |
| 2021/0256070 A1* | 8/2021 | Tran | G06F 16/9536 |
| 2022/0058633 A1* | 2/2022 | Yantis | G06Q 20/4016 |
| 2022/0198562 A1 | 6/2022 | Cella et al. | |
| 2023/0186281 A1* | 6/2023 | Jethmalani | G06Q 20/436 |

OTHER PUBLICATIONS

HYFI Fractions. "Hybrid Finance Blockchain (HYFI)", HYFI Blockchain Network Services, 2023. accessed at https://www.hyfiblockchain.com/wrap/.

* cited by examiner

*Primary Examiner* — Steven S Kim
*Assistant Examiner* — Janice Loza
(74) *Attorney, Agent, or Firm* — Foley & Lardner LLP

(57) ABSTRACT

Aspects of this technical solution can include identifying, by an NFT transaction processor, a first localization property corresponding to an NFT that restricts transfer of the NFT to a first locality, identifying, by the NFT transaction processor, a second localization property corresponding to a second NFT account that restricts transfer of the NFT to a second locality, generating, by the NFT transaction processor in response to a determination that the first localization property and the second localization property differ, a container linked with the second localization property, transferring, by the NFT transaction processor in response to the determination, the NFT to the container, and linking, by the NFT transaction processor, the second public and private key pair with the container to transfer the NFT to the second NFT account.

20 Claims, 6 Drawing Sheets

LOCALIZATION CONTROL FOR NON-FUNGIBLE TOKENS (NFTS) VIA TRANSFER BY CONTAINERIZED DATA STRUCTURES

TECHNICAL FIELD

The present implementations relate generally to electronic networks, and more particularly to localization control for non-fungible tokens (NFTs) via transfer by containerized data structures.

INTRODUCTION

Consumers increasingly expect to conduct financial transactions involving multiple types of transaction denominations. Consumers increasingly expect to transfer assets across types that have values based on differing denominations. However, conventional systems cannot identify market characteristics that drive value of various digital assets, cannot accurately generate values for various digital assets classes with various scarcity characteristics, and cannot effectively execute transactions involving various digital assets.

SUMMARY

Aspects of this technical solution are directed to providing secure localization control to transactions of NFTs across various localities. This technical solution can include a data processing system to maintain various wallet containers of NFTs and localization objects associated with the wallet containers. A data processing system can detect localization of particular NFTs based, for example, a current geographical area or jurisdiction associated with the NFT, and a geographical area or jurisdiction associated with a destination of the NFT. For example, a user can request to transfer an NFT from an origin wallet container corresponding to the United States to a destination wallet container corresponding to the European Union. The data processing system can determine, based on locality parameters associated with one or more of the origin and destination localities, whether a transfer between the requested localities is permitted, and can include various objects in a wallet container at the destination to ensure compatibility with compliance metrics associated with one or more of the origin and destination localities. Thus, a technological solution for localization control for NFTs via transfer by containerized data structures is provided.

At least one aspect is directed to a method to maintain localization of a non-fungible token (NFT) in a transaction. The method can include receiving, by an NFT transaction processor, a request to transfer an NFT from a first NFT account to a second NET account, the first NFT account linked with a first public and private key pair and the second NFT account linked with a second public and private key pair. The method can include identifying, by the NFT transaction processor, a first localization property corresponding to the NFT that restricts transfer of the NFT to a first locality. The method can include identifying, by the NFT transaction processor, a second localization property corresponding to the second NFT account that restricts transfer of the NFT to a second locality. The method can include generating, by the NFT transaction processor in response to a determination that the first localization property and the second localization property differ, a container linked with the second localization property. The method can include transferring, by the NFT transaction processor in response to the determination, the NFT to the container. The method can include linking, by the NFT transaction processor, the second public and private key pair with the container to transfer the NFT to the second NFT account.

At least one aspect is directed to a system to maintain localization of a non-fungible token (NFT) in a transaction, the system can include memory and one or more processors. The system can receive, by an NFT transaction processor, a request to transfer an NFT from a first NFT account to a second NFT account, the first NFT account linked with a first public and private key pair and the second NFT account linked with a second public and private key pair. The system can identify, by the NFT transaction processor, a first localization property corresponding to the NFT that restricts transfer of the NFT to a first locality. The system can identify, by the NFT transaction processor, a second localization property corresponding to the second NFT account that restricts transfer of the NFT to a second locality. The system can generate, by the NFT transaction processor in response to a determination that the first localization property and the second localization property differ, a container linked with the second localization property. The system can transfer, by the NFT transaction processor in response to the determination, the NFT to the container. The system can link, by the NFT transaction processor, the second public and private key pair with the container to transfer the NFT to the second NFT account.

At least one aspect is directed to a computer readable medium can include one or more instructions stored thereon and executable by a processor. The processor can receive a request to transfer an NFT from a first NFT account to a second NFT account, the first NFT account linked with a first public and private key pair and the second NFT account linked with a second public and private key pair. The processor can identify a first localization property corresponding to the NFT that restricts transfer of the NFT to a first locality. The processor can identify a second localization property corresponding to the second NFT account that restricts transfer of the NFT to a second locality. The processor can generate, in response to a determination that the first localization property and the second localization property differ, a container linked with the second localization property. The processor can transfer, in response to the determination, the NFT to the container. The processor can link the second public and private key pair with the container to transfer the NFT to the second NFT account.

BRIEF DESCRIPTION OF THE DRAWINGS

These and other aspects and features of the present implementations will become apparent to those ordinarily skilled in the art upon review of the following description of specific implementations in conjunction with the accompanying figures, wherein.

DETAILED DESCRIPTION

The present implementations will now be described in detail with reference to the drawings, which are provided as illustrative examples of the implementations so as to enable those skilled in the art to practice the implementations and alternatives apparent to those skilled in the art. Notably, the figures and examples below are not meant to limit the scope of the present implementations to a single implementation, but other implementations are possible by way of interchange of some or all of the described or illustrated elements. Moreover, where certain elements of the present implementations can be partially or fully implemented using known components, only those portions of such known components that are necessary for an understanding of the present implementations will be described, and detailed descriptions of other portions of such known components will be omitted so as not to obscure the present implementations. Implementations described as being implemented in software should not be limited thereto, but can include implementations implemented in hardware, or combinations of software and hardware, and vice-versa, as will be apparent to those skilled in the art, unless otherwise specified herein. In the present specification, an implementation showing a singular component should not be considered limiting; rather, the present disclosure is intended to encompass other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

Figure 1:
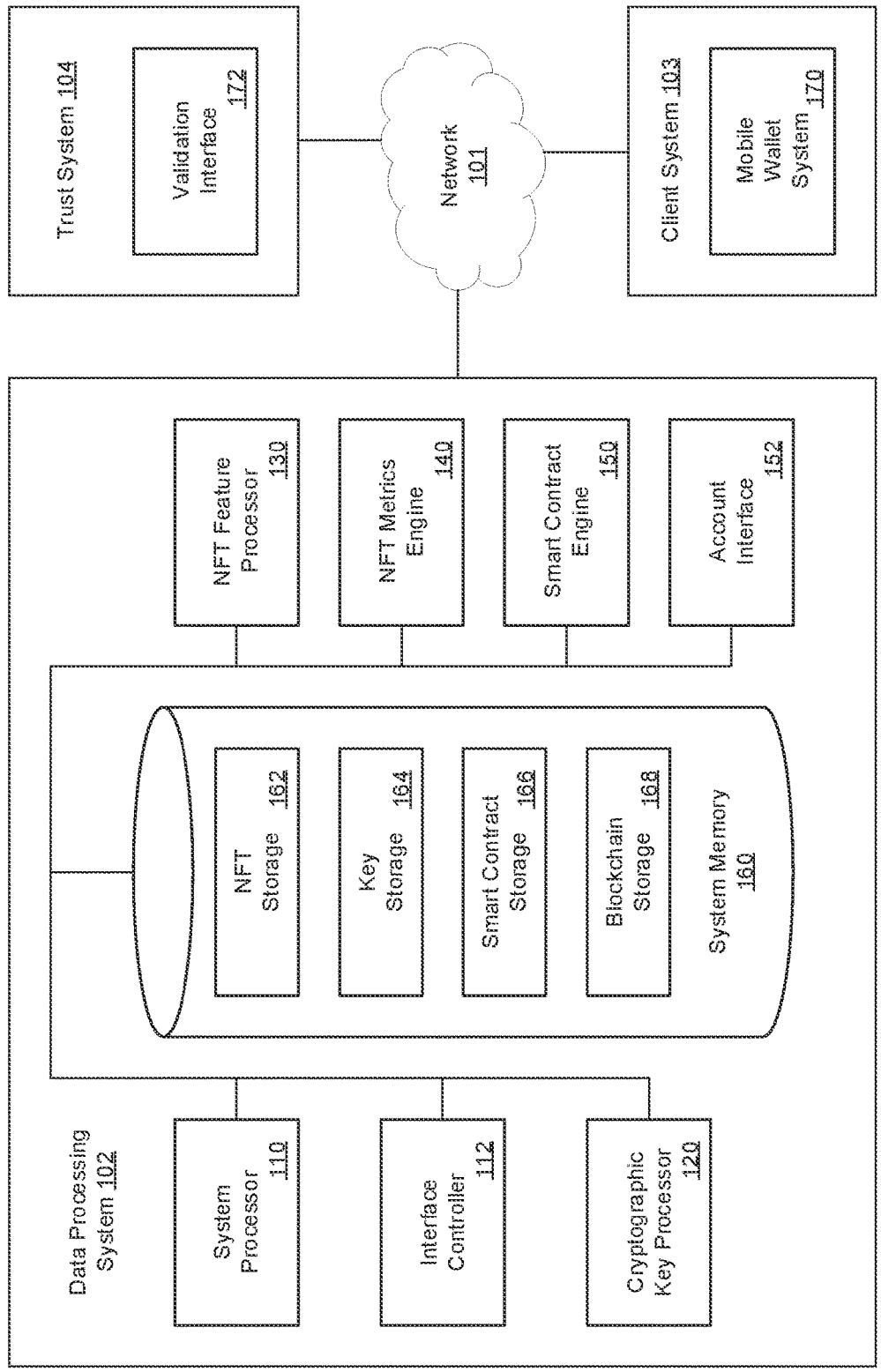
FIG. 1 depicts an example system, in accordance with present implementations.

FIG. 1 depicts an example system, in accordance with present implementations. As illustrated by way of example in FIG. 1, an example system 100 can include at least a network 101, a data processing system 102, a client system 103, and a trust system 104.

The network 101 can include any type or form of network. The geographical scope of the network 101 can vary widely and the network 101 can include a body area network (BAN), a personal area network (PAN), a local-area network (LAN), e.g. Intranet, a metropolitan area network (MAN), a wide area network (WAN), or the Internet. The topology of the network 101 can be of any form and can include, e.g., any of the following: point-to-point, bus, star, ring, mesh, or tree. The network 101 can include an overlay network which is virtual and sits on top of one or more layers of other networks 101. The network 101 can be of any such network topology as known to those ordinarily skilled in the art capable of supporting the operations described herein. The network 101 can utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SD (Synchronous Digital Hierarchy) protocol. The 'TCP/IP internet protocol suite can include application layer, transport layer, internet layer (including, e.g., IPv6), or the link layer. The network 101 can include a type of a broadcast network, a telecommunications network, a data communication network, or a computer network.

The data processing system 102 can include a physical computer system operatively coupled or coupleable with one or more components of the system 100, either directly or directly through an intermediate computing device or system. The data processing system 102 can include a virtual computing system, an operating system, and a communication bus to effect communication and processing. The data processing system 102 can include a system processor 110, an interface controller 112, a cryptographic key processor 120, an NFT feature processor 130, an NFT metrics engine 140, a smart contract engine 150, an account interface 152, and a system memory 160.

The system processor 110 can execute one or more instructions associated with the system 100. The system processor 110 can include an electronic processor, an integrated circuit, or the like including one or more of digital logic, analog logic, digital sensors, analog sensors, communication buses, volatile memory, nonvolatile memory, and the like. The system processor 110 can include, but is not limited to, at least one microcontroller unit (MCU), microprocessor unit (MPU), central processing unit (CPU), graphics processing unit (GPU), physics processing unit (PPU), embedded controller (EC), or the like. The system processor 110 can include a memory operable to store or storing one or more instructions for operating components of the system processor 110 and operating components operably coupled to the system processor 110. For example, the one or more instructions can include one or more of firmware, software, hardware, operating systems, embedded operating systems. The system processor 110 or the system 100 generally can include one or more communication bus controller to effect communication between the system processor 110 and the other elements of the system 100.

The interface controller 112 can link the data processing system 102 with one or more of the network 101, the client system 103, and the account system 104, by one or more communication interfaces. A communication interface can include, for example, an application programming interface ("API") compatible with a particular component of the data processing system 102, the client system 103, or the account system 104. The communication interface can provide a particular communication protocol compatible with a particular component of the data processing system 102 and a particular component of the client system 103 or the account system 104. The interface controller 112 can be compatible with particular content objects, and can be compatible with particular content delivery systems corresponding to particular content objects. For example, the interface controller 112 can be compatible with transmission of video content, audio content, or any combination thereof. For example, the interface controller 112 can be compatible with payment processing transmissions by a protocol compatible with payment processing latency and encryption structures.

The cryptographic key processor 120 can generate and modify cryptographic keys. For example, the cryptographic key processor 120 can include one or more asymmetric or symmetric key generators, and can generate public-private key pairs. For example, a public-private key pair can include a public key configured to encrypt in accordance with a particular transform process. For example, a public-private key pair can include a private key configured to decrypt in accordance with a particular transform process compatible with the public key. The cryptographic key processor 120 can link the public-private key pair with any individual object or component. The cryptographic key processor 120 can link any public key or private key corresponding to the public-private key pair with any individual object or component. For example, the cryptographic key processor 120 can generate a key compatible with or linked with a particular identifier corresponding to a particular, device, user, customer, account, system, or any combination thereof.

The NFT feature processor 130 can identify one or more characteristics of one or more NFTs. For example, the feature processor 130 can identify one or more characteristics of an individual NFT or a plurality of NFTs satisfying one or more criteria. The NFT feature processor 130 can generate a particular feature corresponding to one or more characteristics of an NFT or an object linked with the NFT. For example, a feature can include a scalar or vector quantity corresponding to one or more vales of an aspect of an NFT. For example, a feature can include a list of coordinates corresponding to a line identified in an image linked with an NFT. For example, a feature can include a numeric value corresponding to an identifier of an NFT. For example, criteria by which NFTs can be identified can include aspects of the NFT, fields or components of the NFT, transform processes used to generate or modify the NFT, aspects of a content object linked with the NFT, or any combination thereof. For example, aspects of the NFT can include a hash of the NFT, or a value of an individual field of the NFT. For example, aspects of the NFT can include a hash of the NFT, or a value of an individual field of the NFT. For example, aspects of a content object linked with the NFT can include a bitmap of an image linked with the NFT, or a hash of a media content linked with the NFT. Media content can include images, audio, three-dimensional (3D) models, or any combination thereof.

The NFT metrics engine 140 can generate and modify one or more metrics based on one or more NFTs. For example, the NFT metrics engine 140 can generate a metric based one or more features obtained from the NFT feature processor 130. For example, the NFT metrics engine 140 can generate a metric to indicate a particular value or type of a particular NFT. The NFT metrics engine 140 can generate metrics compatible with particular thresholds. For example, the thresholds can activate particular transforms of an aspect of an NFT, feature or metric. For example, the thresholds can execute one or more instructions corresponding to a particular NFT or type of NFT, type of object linked an NFT, or any combination thereof. For example, the NFT metrics engine 140 can determine that a particular metric having a particular value and based on a type of an NFT satisfies a threshold that indicates a particular value compatible with the particular value of the metric.

The smart contract engine 150 can generate and modify one or more smart contracts. The smart contract engine 150 can execute instructions to generate or modify a cryptographic container, to add or remove objects from a cryptographic container, and to execute various processors linked with or embedded with a smart contract. For example, the smart contract engine 150 can execute various processors of a smart contract in response to an indication from the NFT metrics engine 140 that a metric satisfies a particular threshold. For example, the smart contract engine 150 can execute various processors of a smart contract in response to detecting input including or corresponding to a particular token at the smart contract. For example, the smart contract engine 150 can include processors to read, write, generate, or modify one or more objects contained within a container of the smart contract, one or more tokens input to the smart contract, or one or more processors of the smart contract.

The account interface 152 can communicate with one or more external systems compatible with allocating an NFT. For example, the account interface 152 can include an application programming interface (API) compatible with the account system 104 and the interface controller 112. For example, the account interface 152 can be configured to receive characteristics associated with particular NFTs, accounts, or content objects linked with particular NFTs. For example, the account interface 152 can be configured to receive identifiers corresponding to various NFTs linked with a particular account, account control instructions, currency or asset transfer instruction, or any combination thereof. The account interface 152 can thus provide the technical improvement of detecting and transmitting metrics generated to allocate an NFT between storage locations or blockchain locations. The account interface 152 can provide the technical improvement of providing a communication interface compatible with particular NFT transfer operations.

The system memory 160 can store data associated with the system 100. The system memory 160 can include one or more hardware memory devices to store binary data, digital data, or the like. The system memory 160 can include one or more electrical components, electronic components, programmable electronic components, reprogrammable electronic components, integrated circuits, semiconductor devices, flip flops, arithmetic units, or the like. The system memory 160 can include at least one of a non-volatile memory device, a solid-state memory device, a flash memory device, and a NAND memory device. The system memory 160 can include one or more addressable memory regions disposed on one or more physical memory arrays. A physical memory array can include a NAND gate array disposed on, for example, at least one of a particular semiconductor device, integrated circuit device, and printed circuit board device. The system memory 160 can include an NFT storage 162, a key storage 164, a smart contract storage 166, and a blockchain storage 168.

The NFT storage 162 can include NFTs associated with the data processing system 102 or any component thereof, the client system 103 or any component thereof, any content object, or any combination thereof. The key storage 164 can store cryptographic keys associated with the data processing system 102 or any component thereof, the client system 103 or any component thereof, any content object, or any combination thereof. For example, the key storage 164 can include public-private key pairs or private keys corresponding to particular accounts, NFTs, smart contracts, devices, users, systems, or any combination thereof. The smart contract storage 166 can store one or more smart contracts and corresponding addresses for particular smart contracts that indicate links with the corresponding smart contracts. The blockchain storage 168 can store one or more blockchains linked to one or more smart contracts, tokens, containers, or content objects, by corresponding addresses for particular smart contracts, tokens, containers, or content objects that indicate links with a particular blockchain.

The client system 103 can include a computing system located remotely from the data processing system 102. The client system 103 can include a mobile wallet system 170. The mobile wallet system 170 can include an interface to execute instructions corresponding to a particular wallet account, and to modify the structure or contents of a particular smart contract corresponding to a wallet account. For example, the mobile wallet system 170 can include a user interface to receive input that indicates selections of various NFTs, transactions, accounts, devices, users, or systems. For example, the user interface can include a graphical user interface that can be presented at a display device. The display device can display at least one or more user interface presentations, and can include an electronic display. An electronic display can include, for example, a liquid crystal display (LCD), a light-emitting diode (LED) display, an organic light-emitting diode (OLED) display, or the like. The display device can receive, for example, capacitive or resistive touch input. The mobile wallet system 170 can transmit one or more instructions, tokens, keys, or any combination thereof to, from, or with the data processing system 102.

The trust system 104 can include a computing system remotely from the data processing system 102 and the client system 103. The trust system 104 can correspond to an identify validation entity, and can transmit tokens or the like to indicate whether a particular object is linked with or can be linked with a particular locality. For example, a locality can correspond to a geographical area or jurisdiction, including but not limited to a county, state, nation, federation, customs union, trade block, or deference bloc. For example, a locality can correspond to a nation or trade bloc including a number of nations and having a particular restriction with respect to transfer of an NFT or an asset type corresponding to an NFT. The trust system 104 can include a data structure or registry identifying one or more trustees authorized to validate an identity corresponding to an NFT. The trust system 104 can validate an identity of an owner or controller of an origin or a destination of an NFT. For example, an origin or a destination of an NFT can include a wallet object. The trust system 104 can be authorized by a locality as a delegate of the authority of the locality or can correspond directly to the locality. The trust system 104 can include a validation interface 172.

The validation interface 172 can receive and transmit communication with the data processing system 102 and the client system 103. For example, the validation interface 172 can include an application programming interface ("API") having a particular configuration compatible with the trust system 104. The validation interface 172 can, for example, include a particular API structure including a data transmission channel and an authentication channel. The data transmission channel can be configured to transmit and receive communication with the data processing system 102 corresponding to tokens to request to transfer an NFT. The authentication channel can be configured to transmit and receive communication with the data processing system 102 corresponding to tokens to verify identity of the trust system 104. For example, the authentication channel can require the data processing system 102 to be authenticated or authorized via a system token distinct from the data transmission channel. The authentication channel can confirm via the authorization that a trustee registered at a blockchain of the data processing system 102 is valid with respect to a particular locality or localities corresponding to the trust system 104.

For example, the system can generate, by the NFT transaction processor in response to the determination, a smart contract that can include the container and a control structure that restricts transfer of the NFT to the second locality. For example, the system can link, by the NFT transaction processor, the second public and private key pair with the smart contract to transfer the NFT to the second NFT account. For example, the system can validate, by the NFT transaction processor, that a first trustee identifier of an entity linked with the request matches a second trustee identifier corresponding to an entity authorized to approve the request. The system can transfer, by the NFT transaction processor in response to the validating, the NFT to the container. For example, the system can receive, by the NFT transaction processor from a computing device, an authorization token linked with the first trustee identifier. For example, the system can validate, by the NFT transaction processor, that the first trustee identifier matches a block of a blockchain can include the second trustee identifier.

For example, the system can validate, by the NFT transaction processor, that a first party property of an entity linked with the first account matches a second party property corresponding to a type of entity authorized to approve the request. The system can transferring, by the NFT transaction processor in response to the validating, the NFT to the container. For example, the system can modify, by a locality processor linked with the container and based on one or more of the first localization property and the second localization property, a quantitative value of one or more of the first account and the second account. For example, the system can modify, by the locality processor, a parameter of one or more of the first localization property and the second localization property, the parameter indicating a restriction on transfer of the container according to the second localization property. For example, a computer readable medium can include one or more instructions executable by a processor. The processor can generate a smart contract that can include the container and a control structure that restricts transfer of the NFT to the second locality. The processor can link the second public and private key pair with the smart contract to transfer the NFT to the second NFT account.

Figure 2:
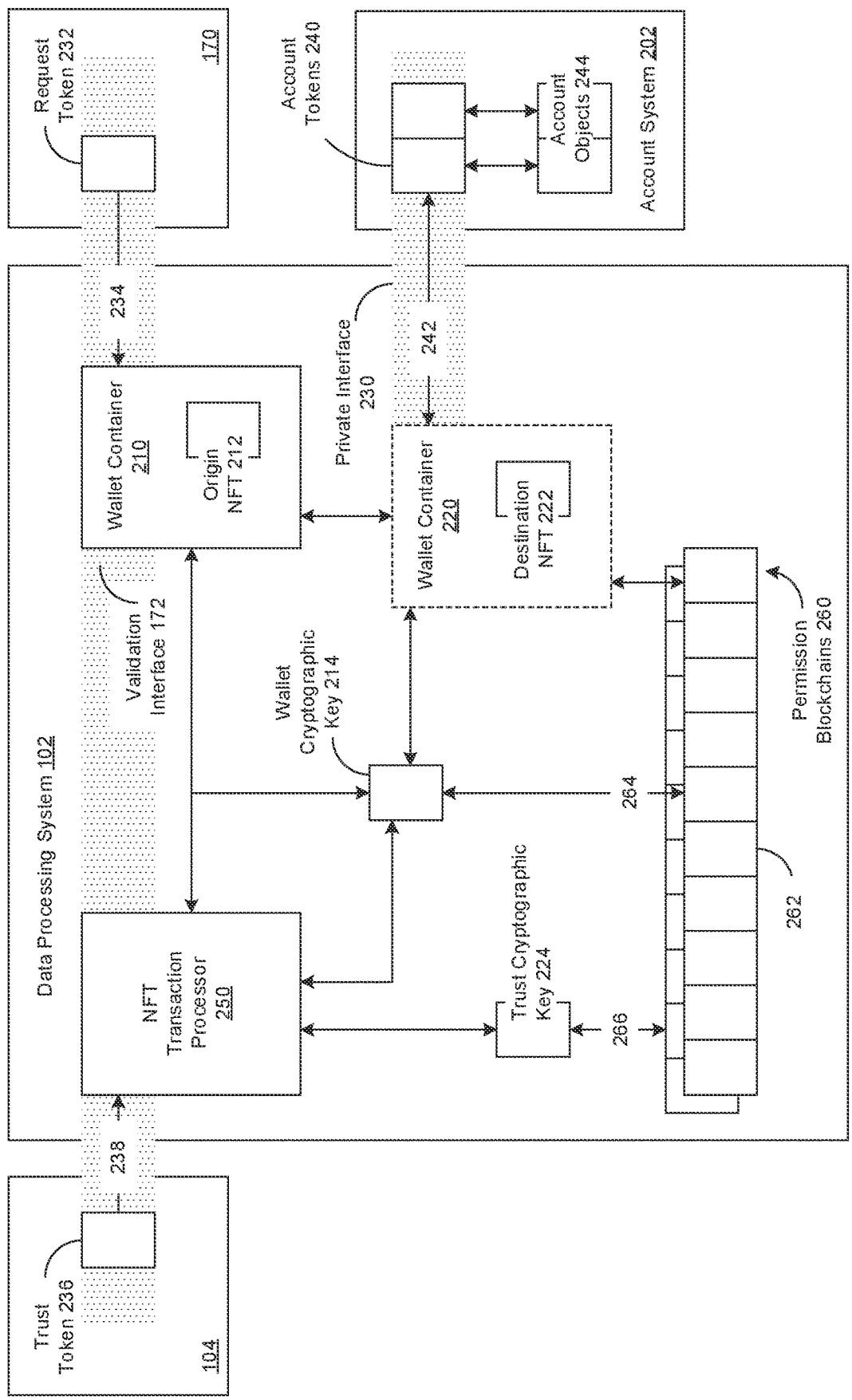
FIG. 2 depicts an example system architecture, in accordance with present implementations.

FIG. 2 depicts an example system architecture, in accordance with present implementations. As illustrated by way of example in FIG. 2, an example system architecture 200 can include at least an account system 202, a wallet container 210, a wallet cryptographic key 214, a wallet container 220, a trust cryptographic key 224, a public interface 230, an account tokens 240, an exchange transmission 242, an account objects 244, an NFT transaction processor 250, and permission blockchains 260.

The account system 202 can generate and modify various data structures corresponding to accounts linked with various entities. For example, the account system 104 can manage or execute various cryptographic keys linked with various accounts. The account system 104 can modify links between particular cryptographic keys or asymmetric key pairs and various accounts. The account system 104 can restrict modification of any account or any content object or NFT linked with a particular account, to requests including or referencing cryptographic keys linked with the account.

The wallet container 210 can include one or more NFTs and keys corresponding to a various accounts and linked with a particular user or device. For example, the wallet container 210 can encapsulate one or more NFTs linked with a particular user within a secure container that restricts transfer of the NFT. For example, the wallet container 210 can encapsulate one or more NFTs linked with a particular locality within a secure container that restricts modification of properties or parameters of the locality. The wallet container 210 can include an interface compatible with the trust system 104, the NFT transaction processor 250, the account system 202, and the mobile wallet system 170. The wallet container 210 can include an origin NFT 212. The origin NFT 212 can be associated with a particular content object, and can be required to transmit output of the content object, transfer the content object to another storage location, or any combination thereof, for example. The origin NFT 212 can indicate control of a particular content by a particular user linked with the wallet container 210 via a cryptographic key or key pair. The wallet container 210 can include zero or more NFTs including the origin NFT 212.

The wallet cryptographic key 214 can include a key compatible with one or more of the wallet container 210 and the wallet container 220. The wallet container 210 or the wallet container 220 can execute a transaction or modify contents of the wallet container 210 or the wallet container 220 in response to detecting input including the wallet cryptographic key 214. The wallet cryptographic key 214 can, for example, include a public-private key pair, a public key, or a private key compatible with the wallet container 210. The wallet container 210 can permit access to the origin NFT 212 based on the wallet cryptographic key 214, for example, compatible with an encapsulation layer and operable to decrypt the encryption corresponding to the encapsulation layer. For example, an encapsulation layer can partially or completely encrypt one or more components of the wallet container 210 or a container or portion thereof.

The wallet container 220 can correspond at least partially in one or more of structure and operation to the wallet container 210. For example, the wallet container 220 can be generated based one or more parameters or objects of the wallet container 210. For example, the wallet container 220 can include a partial or exact copy of one or more objects of the wallet container 210. For example, the wallet container 220 can correspond to a partial or exact copy of the wallet container 210, and can include one or more objects of the wallet container 210 in response to a transfer of one or more objects from the wallet container 210 to the wallet container 220. The wallet container 220 can include a destination NFT 222. The wallet container 220 can communicate with the account system 202 to, for example, modify one or more account objects 244 via one or more account tokens 240 to indicate a transfer or copy of the origin NFT 212 to the wallet container 220 as the destination NFT 222. The destination NFT 222 can correspond at least partially in one or more of structure and operation to the origin NFT 212. For example, the destination NFT 222 can correspond to a partial or exact copy of the origin NFT.

The trust cryptographic key 224 can include a key compatible with and controlled by the data processing system 102. Transmission of the trust cryptographic key 224 can be restricted by the data processing system 102 to within the data processing system 102. The trust cryptographic key 224 can correspond to an entity authorized by the trust system 104. For example, the trust cryptographic key 224 can correspond to a "standing authority" or "standing approval" that must be detected in order to activate processors, decrypt containers of the wallet container 210 or 220, or transfer, generate, or destroy NFTs, keys or objects of the containers of the wallet container 210 or 220. Thus, the trust cryptographic key 224 can restrict modification of the wallet container 210 or 220.

The private interface 230 can include a communication channel between one or more of the wallet container 220, and the account system 202. The private interface 230 can include an application programming interface compatible with the wallet container 220 to detect the trust cryptographic key 224 at the data processing system 102, and one or more of the account tokens 240 at the account system 202. At least the private interface 230 or the wallet container 220 can execute one or more instructions to modify one or more of the account objects 244 via the account token 240 in response to a communication with the wallet container 220. For example, the wallet container 210 can perform any operation with respect to the private interface 230 that is performed or performable by the wallet container 220.

The validation interface 172 can include a request token 232, a request transmission 234, a trust token 236, and a trust transmission 238. The request token 232 can identify an NFT and can identify one or more characteristics linked with the NFT or corresponding to a request to transfer the origin NFT 212, and can identify at least one locality corresponding to the request to transfer the origin NFT 212 or the origin NFT 212. For example, the request token 232 can include an identifier of the origin NFT 212, a hash of the origin NFT 212, an identifier of one or more account objects 244 of the account system 202 linked with the origin NFT 212, one or more account objects 244 of the account system 202 linked with the request to transfer the origin NFT 212, an identifier of a public-private key pair or any portion thereof, or any combination thereof.

For example, the request token 232 can include an identification of a public-private key pair corresponding to an NFT or a wallet container of an NFT. For example, the request token 232 can include an identification of a public-private key pair corresponding to a smart contract. For example, the request token 232 can include an identification of a public-private key pair corresponding to a wallet container of a financial institution. The request transmission 234 can transmit the request token 232 from the client system 103 or the mobile wallet system 170 to the data processing system 102 or the wallet container 210.

The trust token 236 can include an identification of a public-private key pair corresponding to authorization to transfer or modify a wallet container or transfer an NFT. For example, the trust token 236 include an identification of a public-private key pair corresponding to an authority corresponding to a locality or a delegate of a locality. For example, the trust token 236 can include an identification of a public-private key pair corresponding to an authentication of an owner of a wallet container 210 or an origin NFT 212. For example, the trust token 236 can include an identification of a public-private key pair corresponding to an authentication of a locality of a wallet container 210 or an origin NFT 212. The trust token 236 can transmit the request token 232 from the client system 103 or the mobile wallet system 170 to the data processing system 102 or the wallet container 210. The trust transmission 238 can transmit the trust token 236 from the trust system 104 to the data processing system 102 or the wallet container 210. For example, the trust transmission 238 can transmit the trust token 236 via the data transmission channel of the validation interface, in response to a determination via the validation interface, by the wallet container 210, that the trust system 104 is compatible with the trust cryptographic key 224 stored at the permission blockchains 260.

The account tokens 240 can identify various account characteristics and account operations. For example, the account tokens 240 can variously include an identifier of an smart contract, a hash of the smart contract, an identifier of one or more accounts of the account system 104 linked with the NFT, one or more accounts of the account system 104 linked with the request to allocate the NFT, an identifier of a public-private key pair or any portion thereof, one or more request allocation metrics or any combination thereof. The account transmission 242 can include a technical improvement of at least including a format, protocol, or the like compatible with the account system 104, by detecting or transmitting aspects or characteristics of the particular accounts of the account system 104. The account objects 244 can identify various account records. For example, the account objects 244 can variously include an identifier of a financial account of the account system 104. For example, the account objects 244 can variously include metrics corresponding to a denomination or value of the account, and can include links or references to various objects associated therewith. For example, various objects associated with accounts can include NFTs, MBC, fiat currency, or any combination thereof.

The NFT transaction processor 250 can execute one or more actions with respect to various cryptographic keys, NFTs, containers, and smart contracts. For example, the NFT transaction processor 250 can modify links between various containers, NFTs, and smart contracts with various public-private key pairs. The transaction processor 250 can transfer public-private key pairs based on one or more operations of the cryptographic key processor 120, for example. The NFT transaction processor 250 can generate and modify one or more metrics corresponding to various NFTs, including wallet NFTs 212, gated NFTs 222, and exchange NFTs 240, based on one or more operations of the NFT feature processor 130 or the NFT metrics engine 140. The NFT transaction processor 250 can generate or modify one or more containers, accounts, or smart contracts, based on one or more operations of the smart contract engine 150.

The permission blockchains 260 can include at least one blockchain including one or more of the blocks 262. The permission blockchain 260 can be linked with one or more content objects 224, secure NFTs 240, and smart contract control structures 210. The permission blockchain 260 can include a blockchain operated and controlled at the data processing system 102. The permission blockchain 260 can include a plurality of blockchains each corresponding to particular aspects of the links associated with the corresponding blockchains. The permission blockchains 260 can include a block 262, a wallet cryptographic key link 264, and a trust cryptographic key link 266. The blocks 262 can include or store links to one or more objects associated with the blockchain. The wallet cryptographic key link 264 can include a reference, pointer, or the like, to or between a block among the blocks 262 and the wallet cryptographic key 214 associated with that particular block. The trust cryptographic key link 266 can include a reference, pointer, or the like, to or between a block among the blocks 262 and the trust cryptographic key 224 associated with that particular block.

Figure 3:
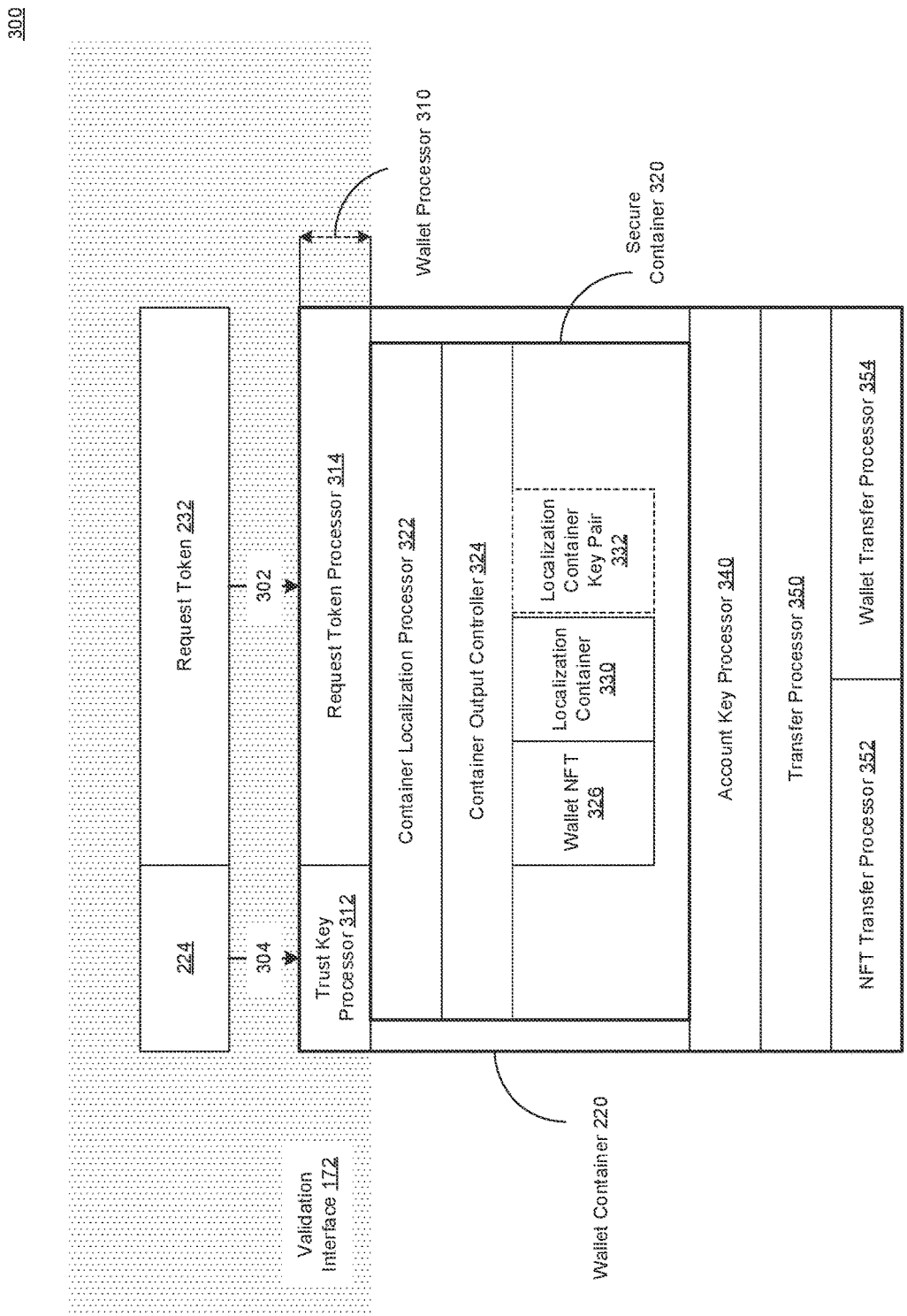
FIG. 3 depicts an example wallet system architecture, in accordance with present implementations.

FIG. 3 depicts an example wallet system architecture, in accordance with present implementations. As illustrated by way of example in FIG. 3, an example wallet system architecture 300 can include at least a request token transmission 302, a trust key transmission 304, a wallet processor 310, a secure container 320, an account key processor 340, a transfer processor 350, an NFT transfer processor 352, and a wallet transfer processor 354. The request token transmission 302 can be responsive to an action by the request interface 230 to transmit the request token 232 to one or more of the wallet containers 210 and 220. The trust key transmission 304 can be responsive to an action by the request interface 230 to transmit the trust cryptographic key 224 to one or more of the wallet containers 210 and 220. The wallet container 210 can perform or be configured to perform all operations discussed herein with respect to the wallet container 220.

The wallet processor 310 can communicate with and validate various tokens and NFTs. The wallet processor 310 can include one or more interfaces corresponding to an API or a smart contract interface, for example. A smart contract interface can include one or more executable instructions integrated with a smart contract. The smart contract interface can execute instructions at the smart contract or triggered by the smart contract in response to detection of objects or conditions external to the smart contract. The wallet processor 310 can comprise at least a portion of a control structure of the smart contract. The wallet processor 310 can include a trust key processor 312, and a request token processor 314.

The trust key processor 312 can detect the presence of the trust cryptographic key 224, and can determine whether the trust cryptographic key 224 is compatible with the trust key processor 312. The trust key processor 312 can be configured to be compatible with a particular trust cryptographic key 224, or can be generated to be compatible with a particular trust cryptographic key 224. For example, the trust key processor 312 can be integrated with or store a hash based on a particular trust cryptographic key 224 and a hash processor operable to generate a hash based on any trust cryptographic key 224. For example, the trust key processor 312 can be compatible with the particular trust system 104 or a particular locality or subset of localities of the trust system 104. For example, the trust key processor 312 can be compatible with all United States or all European Union localities, for a wallet container generated or configured in accordance with those localities. A locality can, for example, include a collection of one or more localities. For example, the trust key processor 312 can include a public key or a private key of a key pair of a particular trust cryptographic key 224, and can authenticate at least a portion of the trust cryptographic key 224 based on a hash or comparison with the portion of the trust cryptographic key 224. The trust key processor 312 can generate a hash in response to detecting the presence of the trust cryptographic key 224, and can determine whether the trust cryptographic key 224 is compatible with the wallet container 210 or 220, in response generating the hash, by comparing the generated hash with the stored hash. The trust key processor 312 can include logic to detect a trust cryptographic key 224 passed to it, by, for example, a JSON object or a header argument.

The request token processor 314 can detect the request token 232 obtained by the wallet container 220. The request token transmission 302 can be responsive to an action by the validation interface 172 to transmit the request token 232 to the wallet container 220. The request token processor 314 can detect the request token 232 obtained by the wallet container 220 via the validation interface 172. The request token processor 314 can extract or generate one or more of an origin locality parameter and a destination locality parameter from the request token 232. For example, an origin locality parameter can identify a locality corresponding to the origin NFT 212. For example, a destination locality parameter can identify a locality corresponding to the destination NFT 222, or a locality on which generation or modification of the wallet container 220 or the destination NFT 222 may be based.

The secure container 320 can include a security layer that restricts access to one or more of objects, NFTs or cryptographic keys thereof or contained therein. The container 320 can include, for example, a security encapsulation that partially or completely encrypts one or more components of the container 320. The secure container 320 can include a container localization processor 322, a container output controller 324, a wallet NFT 326, a localization container 330, and a localization container key pair 332.

The container localization processor 322 can modify or generate a localization container or any objects thereof. The container localization processor 322 can identify one or more of an origin locality parameter and a destination locality parameter from the request token 232, or by receiving one or more of an origin locality parameter and a destination locality parameter from the request token processor 314. The container localization processor 322 can request, via the validation interface, various objects corresponding to one or more of the origin locality and the destination locality, and can generate or modify the localization container 330 based on one or more of the origin locality parameter, the destination locality parameter, the trust cryptographic key 224, and the request token 232. For example, the container localization processor 322 can generate the localization container 330 restricted to or including objects corresponding to the destination locality parameter. For example, the container localization processor 322 can modify the localization container 330 to be restricted to or including objects corresponding to the destination locality parameter. For example, the destination locality parameter can correspond to the European Union, and the origin locality parameter can correspond to the United States.

The container output controller 324 can selectively transfer at least NFTs and cryptographic keys from and to the secure container 320 based on determinations from the container key processor 322. For example, the container output controller 324 can transfer an NFT to the container 320 in response to a determination that the cryptographic key is compatible with the container key processor 322. The secure container 320 can include any number or combination of zero or more NFTs and zero or more keys, and is not limited to the examples illustrated herein. The wallet NFT 326 can correspond to the origin NFT 212.

The localization container 330 can include a security layer distinct from the security layer of the secure container 320. The security layer of the localization container 330 can restrict access to one or more of objects, NFTs or cryptographic keys thereof or contained therein. The localization container 330 can include, for example, a security encapsulation that partially or completely encrypts one or more components of the localization container 330. The localization container 330 can be, for example, encapsulated with an encryption compatible with or restricted to decryption by the trust cryptographic key 224, or restricted to decryption by a trust cryptographic key corresponding to the destination locality. For example, the localization container 330 can permit output by one or more objects thereof in response to a determination that trust cryptographic key corresponding to the destination locality is compatible with the encapsulation layer or security layer of the localization container 330. Thus, the localization container 330 can provide at least the technical improvement of providing localization parameters for an NFT integrated into a single secure wallet structure.

The localization container key pair 332 can include a reference or pointer to a localization container. The secure container 320 can optionally include the localization container key pair 332 referencing a localization container external to the wallet container 220, instead of or in addition to the localization container 330. For example, the localization container key pair 332 can include a reference or pointer to a block of one or more of the blockchains 260 referencing a localization container corresponding to a particular locality. Thus, the localization container key pair 332 can provide at least the technical improvement of providing localization parameters for an NFT be reference to a centralized localization container of parameters, to reduce or eliminate duplicative storage of localization containers or localization parameters.

The account key processor 340 can generate, transfer, and modify various cryptographic keys. The account key processor 340 can transfer one or more of the account key pairs 330, 332 and 334 to or from the container 320 of the wallet container 210. For example, the account key processor 340 can transfer a cryptographic key pair, a public key, a private key, a symmetric key, or any combination thereof, to or from the container 320 to indicate a change in control of a particular account to the wallet container. The account key processor 340 can authenticate the wallet container 210 to a particular account system based on a key of the container 320. For example, the account key processor 340 can identify an NFT account associated with the NFT account key pair 330. For example, the account key processor 340 can transmit a hash based on the NFT account key pair 330 to an NFT account associated with the NFT account key pair 330, to authenticate the wallet container 210 to the NFT account associated with the NFT account key pair 330.

The transfer processor 350 can transfer and modify various NFTs, containers, and wallet objects. The transfer processor 350 can determine to and initiate a transfer of an origin NFT 212 or generation of a destination NFT 222. For example, the transfer processor 350 can transfer an NFT in response to an indication by the account key processor 340 that the account is linked with and authorized to a particular NFT account. The transfer processor 350 can include an NFT transfer processor 352 and a wallet transfer processor 354. The NFT transfer processor 352 can transfer and modify various NFTs. For example, the NFT transfer processor 352 can obtain the wallet NFT from an external source. For example, an external source can include the wallet container 210 or a source external to the data processing system 102. The NFT transfer processor 352 can insert the wallet NFT 326 into the secure container 320. The wallet transfer processor 354 can transfer and modify various wallet containers. For example, the wallet transfer processor 354 can generate or obtain a cryptographic key pair corresponding to a particular wallet container. The wallet transfer processor 354 can insert the cryptographic key pair corresponding to a particular wallet container into the secure container 320 or a storage region of the wallet transfer processor 354.

Figure 4:
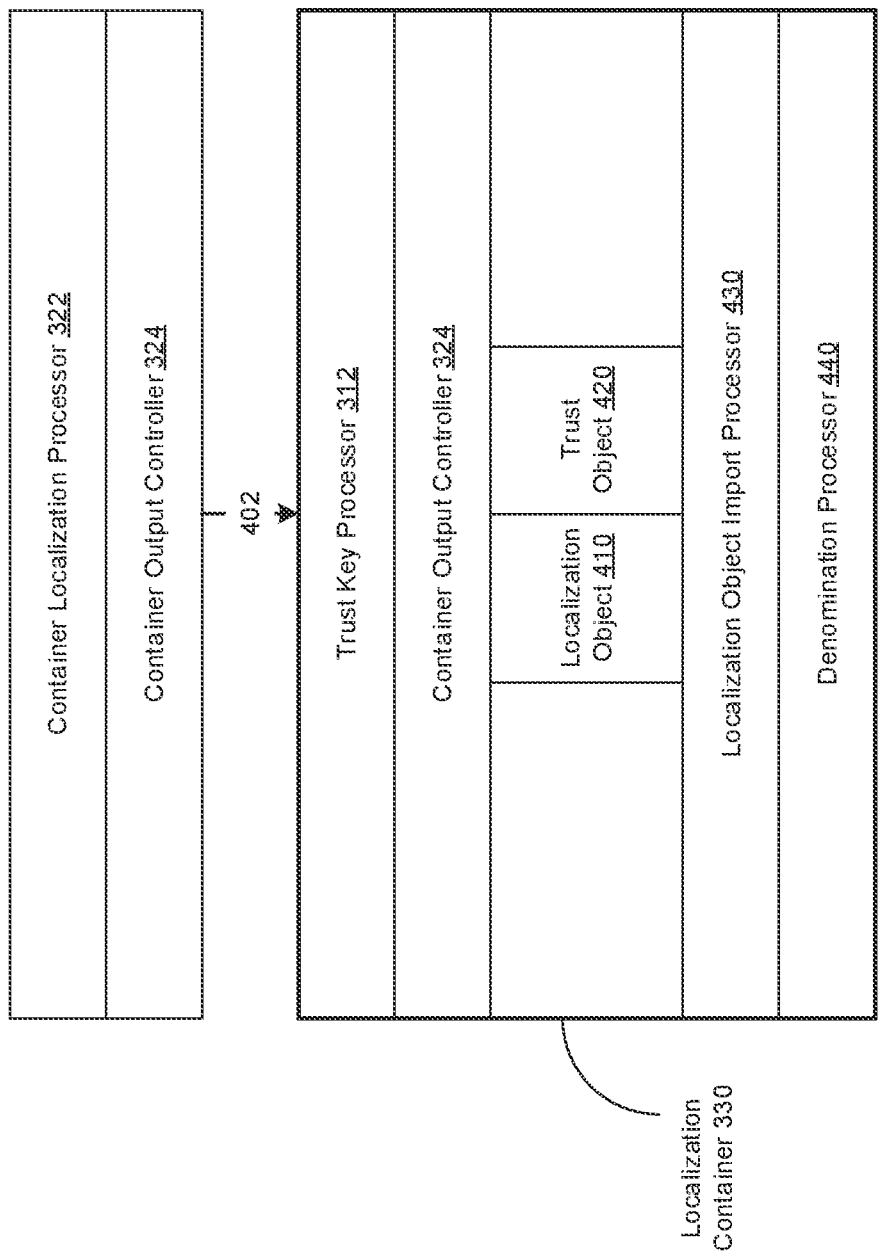
FIG. 4 depicts an example localization system architecture, in accordance with present implementations.

FIG. 4 depicts an example localization system architecture, in accordance with present implementations. As illustrated by way of example in FIG. 4, an example localization system architecture 400 can include at least a trust key transmission 402, a localization object 410, a trust object 420, a localization object import processor 430, and a denomination processor 440. The trust key transmission 402 can be responsive to an action by one or more of the container localization processor 322 and the container output processor 324 to transmit the trust cryptographic key 224 to one or more of the wallet containers 210 and 220. The trust key transmission 402 can be responsive to or subsequent to the include trust key transmission 304.

The localization object 410 can include a content object linked with or corresponding to a particular locality. For example, the localization object 410 can include text or media content corresponding to a document, disclosure, or prospectus for a required disclosure in a particular locality. For example, the United States may require a first particular disclosure with respect to an NFT, while the European Union may require a second particular disclosure with respect to an NFT. Any number of localization objects 410 can be included in the localization container 330, or removed from the localization container 330, to satisfy disclosure requirements corresponding to a particular jurisdiction. The trust object 420 can include a cryptographic key, identifier, token, or the like, corresponding to a particular trust cryptographic key. For example, the trust object 420 can correspond to or be based on a trust cryptographic key for a destination locality. The destination locality can correspond to locality of the owner of the destination NFT 222, for example. The trust object 420 can correspond to a trust cryptographic key or a hash, token, or the like based on the trust cryptographic key.

The localization object import processor 430 can generate or obtain one or more objects corresponding to or linked with a particular locality. The localization object import processor 430 can communicate with the trust system 104 or the validation interface 172 to obtain one or more objects corresponding to the locality. The localization object import processor 430 can communicate with the trust system 104 or the validation interface 172 to obtain one or more parameters corresponding to the locality, and can generate one or more objects corresponding to the locality. For example, the localization object import processor 430 can obtain from the trust system 104 via the validation interface 172, one or more parameters indicating metrics corresponding to required disclosure corresponding to an asset or type of asset in a locality. The localization object import processor 430 can generate an object including or based on the metrics obtained from the trust system 104. For example, the localization object import processor 430 can generate a prospectus object including properties of an NFT compatible with the metrics obtained from the trust system 104 and corresponding to required disclosure corresponding to the NFT or an NFT in a locality.

The denomination processor 440 can generate or modify a quantitative value of an NFT. For example, the denomination transform processor 440 can generate or modify a quantitative value linked with the wallet NFT 326 corresponding to a fiat currency or math-based currency. The denomination processor 440 can generate a second quantitative value or modify quantitative value to a value corresponding to a fiat currency or math-based currency. For example, the denomination processor 440 can generate a value in Euro (EUR) based on a value in United States dollars (USD) linked with the wallet NFT 326 in response to a request to transfer the wallet NFT 326 from a locality corresponding to the United States to a locality corresponding to the European Union. The denomination processor 440 can obtain one or more denomination metrics from the trust system 104 via the validation interface 172 to generate or modify the quantitative value of the NFT. For example, a denomination metric can correspond to an exchange rate between fiat currencies, math-based currencies, or any combination thereof.

Figure 5:
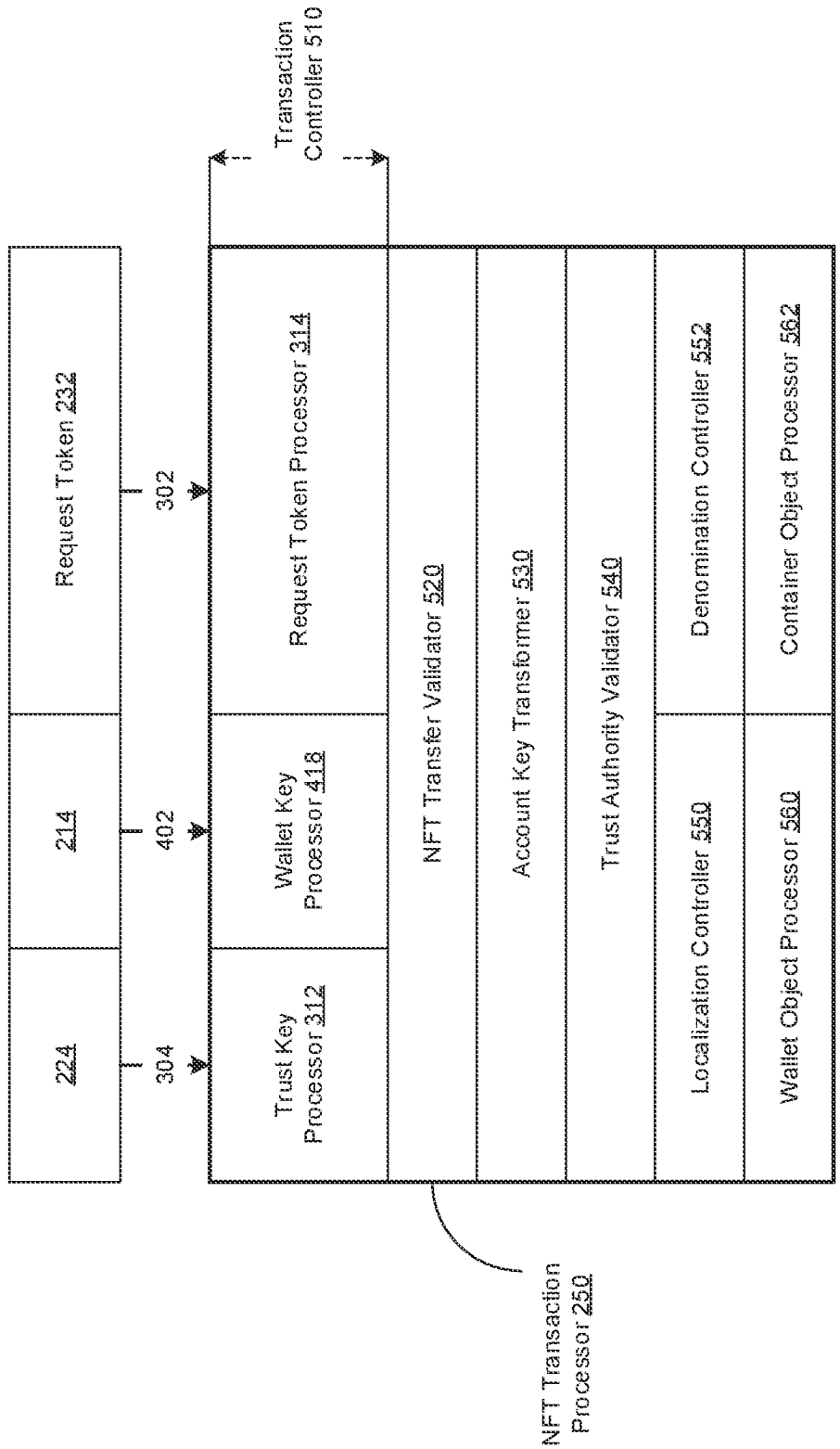
FIG. 5 depicts an example transaction processor, in accordance with present implementations.

FIG. 5 depicts an example transaction processor, in accordance with present implementations. As illustrated by way of example in FIG. 5, an example transaction processor 500 can include at least a transaction controller 510, an NFT transfer validator 520, an account key transformer 530, a trust authority validator 540, a localization controller 550, and a wallet object processor 560. The transaction controller 510 can detect presence of a token, and can transmit the token to a token processor compatible with that particular token. The transaction controller 510 can include the trust key processor 312, the request token processor 314, and the wallet key processor 418.

The NFT transfer validator 520 can determine whether an NFT of the wallet container 210 or 220 is compatible with a transfer. For example, the NFT transfer validator 520 can include one or more metrics indicating that NFTs having aspects or characteristics can be transferred to or from the user wallet container 210 or 220. For example, a particular NFT in the secure container 320 of the wallet container 210 may be incompatible with a transfer or restricted from transfer by a minting restriction. For example, a minting restriction can restrict transfer of an NFT from a particular locality or to a particular locality. For example, the NFT transfer validator 520 can include or reference a transfer restriction linked with a minting restriction, and can block execution of a transfer of the NFT from or to the user wallet container 210 or the system wallet container 220 in response to detecting the minting restriction or transfer restriction. For example, the NFT transfer validator 520 can identify that an NFT is restricted from transfer outside of the United States based on a particular characteristic of the NFT or a content object linked with the NFT in view of a locality restriction linked with a locality corresponding to the United States. For example, the NFT transfer validator 520 can identify that an NFT is restricted from transfer to the United States based on a particular characteristic of the NFT or a content object linked with the NFT in view of a locality restriction linked with a locality corresponding to the United States or a locality corresponding to an origin of the NFT or a locality of minting of the NFT. For example, the NFT transfer validator 520 can include or reference a transfer authorization linked with a minting parameter, and can permit or initiate execution of a transfer of the NFT from or to the user wallet container 210 or the system wallet container 220 in response to detecting the minting parameter linked with the transfer authorization. For example, the NFT transfer validator 520 can link with a wallet container 210 and receive an identification of or reference to a particular NFT. The NFT transfer validator 520 can then determine one or more characteristics or aspects of an NFT associated with a request to transfer that NFT, in response to receiving a transmission from or via the wallet container 210.

The account key transformer 530 can generate and modify one or more cryptographic keys associated with particular accounts or devices in communication with the smart contract engine 150. For example, the account key transformer 530 can identify a public-private key pair corresponding to a wallet container of a buyer of an NFT. The account key transformer 530 can modify one or more keys of the public-private key pair to link with a different account of the account system 104, an additional account of the account system 104, a substitute account of the account system 104, or any combination thereof.

The trust authority validator 540 can determine that a trust system or a communication with a trust system 104 satisfies a validation criterion. The trust authority validator 540 can determine, based on one or more operations, that a trust system 104 is authorized to transmit a trust token to the data processing system 102, and is authorized to provide trust tokens corresponding to a particular locality or plurality of localities. For example, the trust authority validator 540 can determine that the trust system 104 is authorized to transmit trust tokens corresponding to the United States and states thereof. For example, the trust authority validator 540 can determine that the trust system 104 is authorized to transmit trust tokens corresponding to a particular organization, trust, or entity, associated with a wallet container 210 or an origin NFT 212 to validate a request to transfer the origin NFT 212 to or from a locality linked with the trust system 104.

The localization controller 550 can identify a locality or plurality of localities corresponding to the request, and can instruct one or more of the wallet container 210, the localization container 330, any component thereof, or any combination thereof, to perform one or more operations based on the identified locality or plurality of localities corresponding to the request. The localization controller 550 can instruct one or more of the localization container 330, any component thereof including the denomination processor 440, or any combination thereof, to perform one or more operations based on the identified locality or plurality of localities corresponding to the request. The wallet object processor 560 can instruct any wallet container, including the wallet container 210 or 220, to perform one or more operations based on the identified locality or plurality of localities corresponding to the request. The wallet object processor 560 can include a container object processor 562. The container object processor 562 can instruct the localization container 330, or any component thereof, to perform one or more operations based on the identified locality or plurality of localities corresponding to the request.

Figure 6:
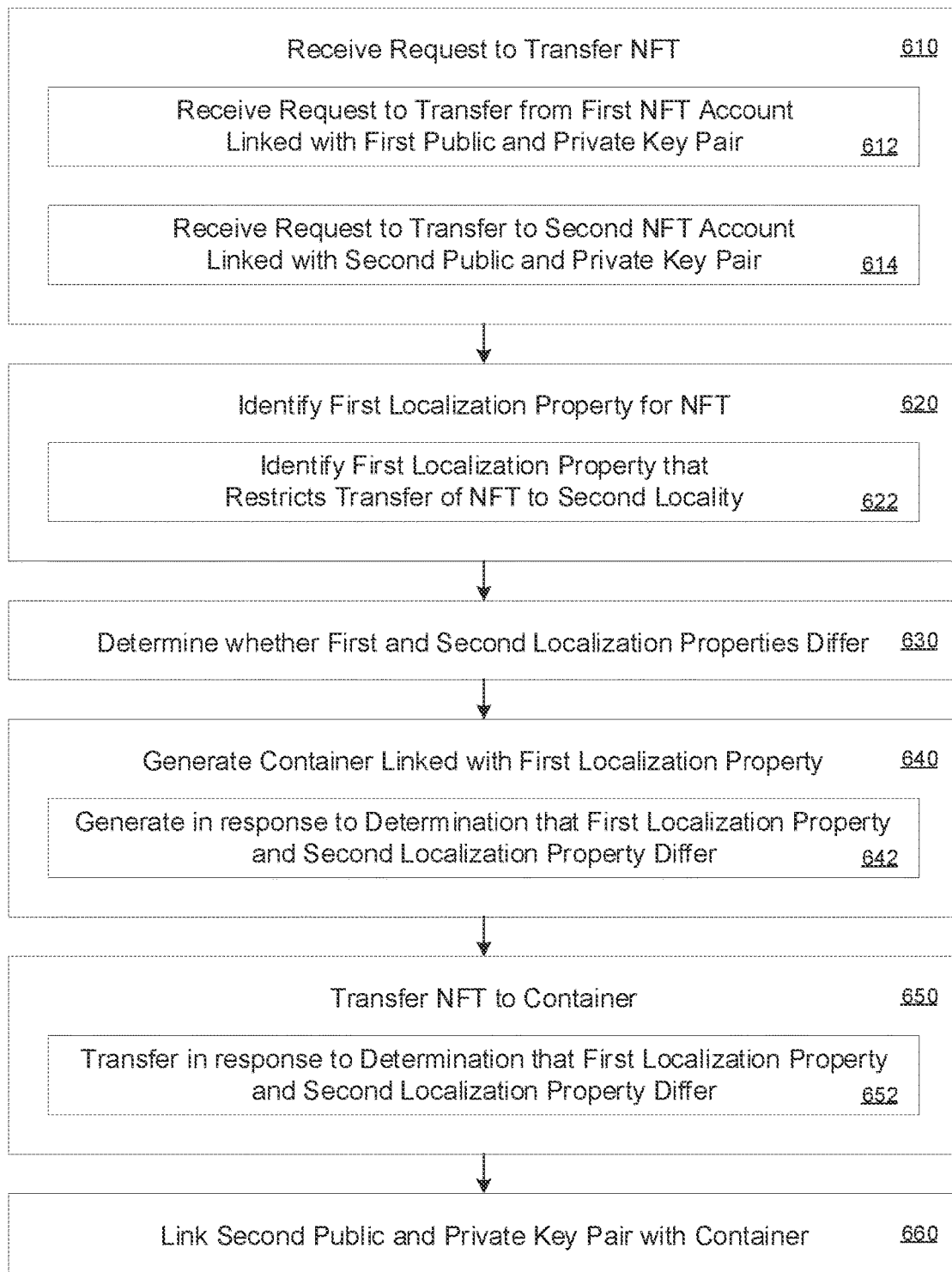
FIG. 6 depicts an example NFT localization, in accordance with present implementations.

FIG. 6 depicts an example NFT localization, in accordance with present implementations. At least one of the system 100 and the device 200 can perform method 600. At 610, the method 600 can receive a request to transfer an NFT. For example, the method 600 can include receiving, by the NFT transaction processor from a computing device, an authorization token linked with the first trustee identifier. At 612, the method 600 can receive a request to transfer an NFT from a first NFT account linked with a first public and private key pair. At 614, the method 600 can receive a request to transfer an NFT to a second NFT account linked with a second public and private key pair. At 620, the method 600 can identify a first localization property for an NFT. At 622, the method 600 can identify a first localization property that restricts transfer of an NFT to a second locality.

At 630, the method 600 can determine whether a first localization property and a second localization property differ. For example, the method can include validating, by the NFT transaction processor, that a first party property of an entity linked with the first account matches a second party property corresponding to a type of entity authorized to approve the request. The method can include transferring, by the NFT transaction processor in response to the validating, the NFT to the container.

At 640, the method 600 can generate a container linked with a first localization property. For example, the method 600 can include generating, by the NFT transaction processor in response to the determination, a smart contract that can include the container and a control structure that restricts transfer of the NFT to the second locality. At 642, the method 600 can generate a container linked with a first localization property, in response to a determination that a first localization property and a second localization property differ.

At 650, the method 600 can transfer an NFT to a container. For example, the method 600 can include validating, by the NFT transaction processor, that a first trustee identifier of an entity linked with the request matches a second trustee identifier corresponding to an entity authorized to approve the request. The method can include transferring, by the NFT transaction processor in response to the validating, the NFT to the container. For example, the method 600 can include validating, by the NFT transaction processor, that the first trustee identifier matches a block of a blockchain that can include the second trustee identifier. At 652, the method 600 can transfer an NFT to a container in response to a determination that a first localization property and a second localization property differ.

At 660, the method 600 can link a second public and private key pair with a container. For example, the method 600 can include linking, by the NFT transaction processor, the second public and private key pair with the smart contract to transfer the NFT to the second NFT account. For example, the method 600 can include modifying, by a locality processor linked with the container and based on one or more of the first localization property and the second localization property, a quantitative value of one or more of the first account and the second account. For example, the method 600 can include modifying, by the locality processor, a parameter of one or more of the first localization property and the second localization property, the parameter indicating a restriction on transfer of the container according to the second localization property. For example, a locality processor can correspond at least partially to one or more of the container localization processor 322, the localization object import processor 430, and the localization controller 550.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A method to maintain localization of a non-fungible token (NFT) in a transaction, the method comprising:
    receiving, by an NFT transaction processor, a request to transfer an NFT from a first NFT account to a second NFT account, the first NFT account linked with a first public and private key pair and the second NFT account linked with a second public and private key pair;
    identifying, by the NFT transaction processor, a first localization property corresponding to the first NFT account, the first localization property configured to restrict transfer of the NFT to a first locality associated with a first geographical area, the first localization property comprising a first disclosure requirement of the first locality;
    identifying, by the NFT transaction processor, a second localization property corresponding to the second NFT account, the second localization property configured to restrict transfer of the NFT to a second locality associated with a second geographical area, the second localization property comprising a second disclosure requirement of the second locality;
    determining, by the NFT transaction processor, whether the first localization property and the second localization property differ;
    in response to determining that the first localization property and the second localization property differ:
        generating, by the NFT transaction processor, a container linked with the second localization property, and
        transferring, by the NFT transaction processor, the NFT to the container; and
    linking, by the NFT transaction processor, the second public and private key pair with the container to transfer the NFT to the second NFT account.

2. The method of claim 1, further comprising:
generating, by the NFT transaction processor in response to the determination, a smart contract including the container and a control structure that restricts transfer of the NFT to the second locality.

3. The method of claim 2, further comprising:
linking, by the NFT transaction processor, the second public and private key pair with the smart contract to transfer the NFT to the second NFT account.

4. The method of claim 1, further comprising:
validating, by the NFT transaction processor, that a first trustee identifier of an entity linked with the request matches a second trustee identifier corresponding to an entity authorized to approve the request; and
transferring, by the NFT transaction processor in response to the validating, the NFT to the container.

5. The method of claim 4, further comprising:
receiving, by the NFT transaction processor from a computing device, an authorization token linked with the first trustee identifier.

6. The method of claim 4, further comprising:
validating, by the NFT transaction processor, that the first trustee identifier matches a block of a blockchain including the second trustee identifier.

7. The method of claim 1, further comprising:
validating, by the NFT transaction processor, that a first party property of an entity linked with the first account matches a second party property corresponding to a type of entity authorized to approve the request; and
transferring, by the NFT transaction processor in response to the validating, the NFT to the container.

8. The method of claim 1, further comprising:
modifying, by a locality processor linked with the container and based on one or more of the first localization property and the second localization property, a quantitative value of one or more of the first account and the second account.

9. The method of claim 8, further comprising:
modifying, by the locality processor, a parameter of one or more of the first localization property and the second localization property, the parameter indicating a restriction on transfer of the container according to the second localization property.

10. A system to maintain localization of a non-fungible token (NFT) in a transaction, the system comprising:
memory and one or more processors to:
receive, by an NFT transaction processor, a request to transfer an NFT from a first NFT account to a second NFT account, the first NFT account linked with a first public and private key pair and the second NFT account linked with a second public and private key pair;
identify, by the NFT transaction processor, a first localization property corresponding to the first NFT account, the first localization property configured to restrict transfer of the NFT to a first locality associated with a first geographical area, the first localization property comprising a first disclosure requirement of the first locality;
identify, by the NFT transaction processor, a second localization property corresponding to the second NFT account, the second localization property configured to restrict transfer of the NFT to a second locality associated with a second geographical area, the second localization property comprising a second disclosure requirement of the second locality;
determine, by the NFT transaction processor, whether the first localization property and the second localization property differ;
determining that the first localization property and the second localization property differ:
generate, by the NFT transaction processor, a container linked with the second localization property, and
transfer, by the NFT transaction processor, the NFT to the container; and
link, by the NFT transaction processor, the second public and private key pair with the container to transfer the NFT to the second NFT account.

11. The system of claim 10, the processors to:
generate, by the NFT transaction processor in response to the determination, a smart contract including the container and a control structure that restricts transfer of the NFT to the second locality.

12. The system of claim 11, the processors to:
link, by the NFT transaction processor, the second public and private key pair with the smart contract to transfer the NFT to the second NFT account.

13. The system of claim 10, the processors to:
validate, by the NFT transaction processor, that a first trustee identifier of an entity linked with the request matches a second trustee identifier corresponding to an entity authorized to approve the request; and
transfer, by the NFT transaction processor in response to the validating, the NFT to the container.

14. The system of claim 13, the processors to:
receive, by the NFT transaction processor from a computing device, an authorization token linked with the first trustee identifier.

15. The system of claim 13, the processors to:
validate, by the NFT transaction processor, that the first trustee identifier matches a block of a blockchain including the second trustee identifier.

16. The system of claim 10, the processors to:
validate, by the NFT transaction processor, that a first party property of an entity linked with the first account matches a second party property corresponding to a type of entity authorized to approve the request; and
transferring, by the NFT transaction processor in response to the validating, the NFT to the container.

17. The system of claim 10, the processors to:
modify, by a locality processor linked with the container and based on one or more of the first localization property and the second localization property, a quantitative value of one or more of the first account and the second account.

18. The system of claim 17, the processors to:
modify, by the locality processor, a parameter of one or more of the first localization property and the second localization property, the parameter indicating a restriction on transfer of the container according to the second localization property.

19. A non-transitory computer readable medium including one or more instructions stored thereon and executable by a processor to:
receive a request to transfer an NFT from a first NFT account to a second NFT account, the first NFT account linked with a first public and private key pair and the second NFT account linked with a second public and private key pair;
identify a first localization property corresponding to the first NFT account, the first localization property configured to restrict transfer of the NFT to a first locality associated with a first geographical area, the first localization property comprising a first disclosure requirement of the first locality;
identify a second localization property corresponding to the second NFT account, the second localization property configured to restrict transfer of the NFT to a second locality associated with a second geographical area, the second localization property comprising a second disclosure requirement of the second locality;
determine, by the NFT transaction processor, whether the first localization property and the second localization property differ;
in response to determining that the first localization property and the second localization property differ:
generate, by the NFT transaction processor, a container linked with the second localization property, and
transfer, by the NFT transaction processor, the NFT to the container; and
link, by the NFT transaction processor, the second public and private key pair with the container to transfer the NFT to the second NFT account.

20. The non-transitory computer readable medium of claim 19, wherein the computer readable medium further includes one or more instructions executable by the processor to:
generate a smart contract including the container and a control structure that restricts transfer of the NFT to the second locality; and
link the second public and private key pair with the smart contract to transfer the NFT to the second NFT account.

* * * * *